Figure 1:
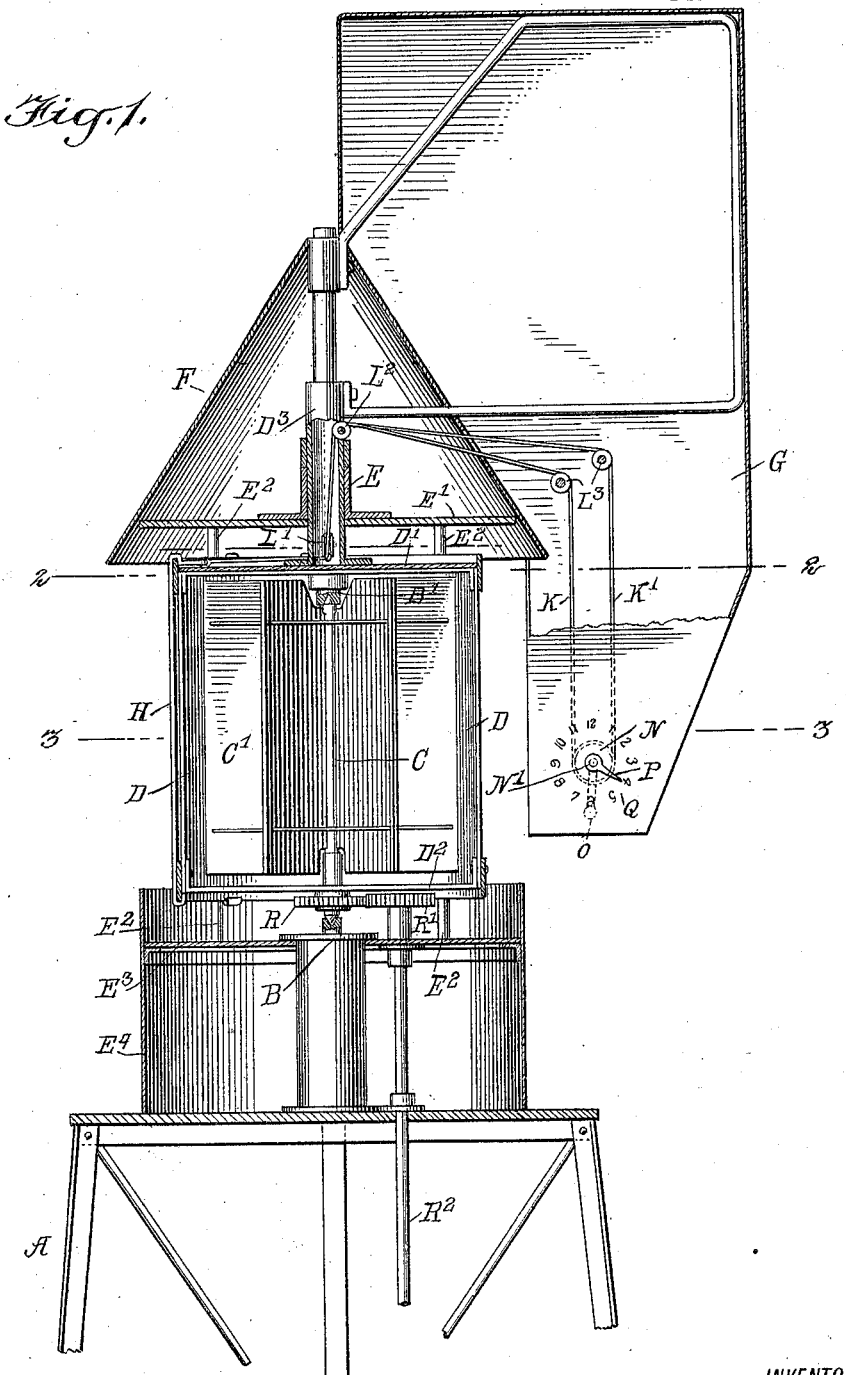

W. T. SANTALA.
WINDMILL.
APPLICATION FILED JULY 3, 1912.

1,049,274.

Patented Dec. 31, 1912.

2 SHEETS—SHEET 1.

WITNESSES

INVENTOR
Wilhelm T. Santala
BY
ATTORNEYS

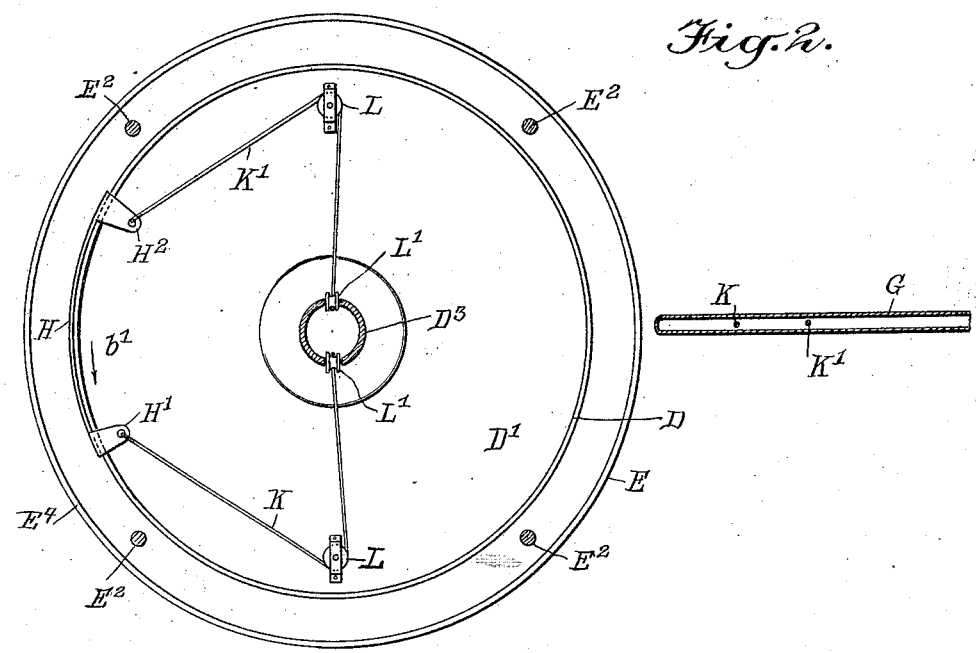
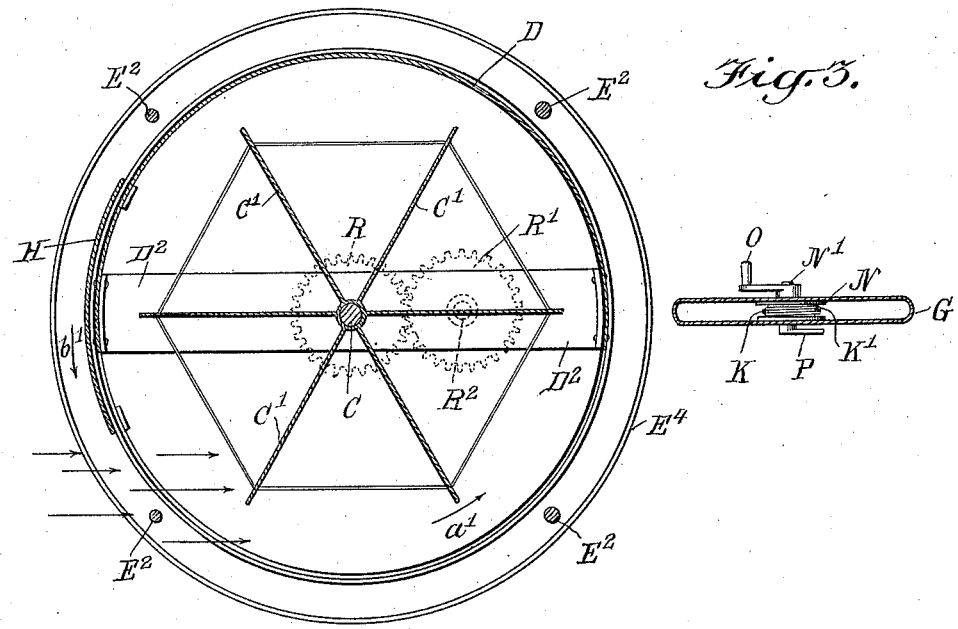

UNITED STATES PATENT OFFICE.

WILHELM T. SANTALA, OF GEORGETOWN, CONNECTICUT.

WINDMILL.

1,049,274.      Specification of Letters Patent.      Patented Dec. 31, 1912.

Application filed July 3, 1912. Serial No. 707,480.

*To all whom it may concern:*

Be it known that I, WILHELM T. SANTALA, a subject of the Czar of Russia, and a resident of Georgetown, in the county of Fairfield and State of Connecticut, have invented a new and Improved Windmill, of which the following is a full, clear, and exact description.

The object of the invention is to provide a new and improved wind mill arranged to hold the wind wheel at all times in the wind, and to permit of exposing more or less of the wheel to the action of the wind according to the power thereof thus insuring a proper running of the wind wheel in light or heavy wind.

For the purpose mentioned, use is made of a wind wheel, a segmental casing inclosing a portion of the wind wheel and mounted to turn independently thereof, a vane on the said casing, a cut-off valve movable on the casing, and a drum on the vane and connected by flexible connections with the said cut-off valve to shift the latter on the casing to form more or less of an extension thereof.

A practical embodiment of the invention is represented in the accompanying drawings forming a part of this specification, in which similar characters of reference indicate corresponding parts in all the views.

Figure 1 is a sectional side elevation of the wind wheel; Fig. 2 is a sectional side elevation of the same on the line 2—2 of Fig. 1; and Fig. 3 is a similar view of the same on the line 3—3 of Fig. 1.

The wind mill is mounted on a suitably constructed tower A supporting a step or bearing B for the lower end of a wind wheel shaft C from which radiate wings C' to form a wind wheel. The upper end of the shaft C is mounted in a bearing B' attached to the under side of the top D' of a casing D extending around a portion of the peripheral face of the wind wheel throughout the height thereof, as plainly indicated in the drawings, the casing D being preferably extended so as to describe a little more than a semicircle, as indicated in Fig. 3, and having its lower end provided with a cross bar $D^2$ mounted to turn loosely on the lower end of the shaft C. From the top D' of the casing D extends centrally a hollow shaft $D^3$ journaled in suitable bearings E attached to a top plate E' supported by rods $E^2$ from a plate $E^3$ held in a circular casing $E^4$ supported on the tower A and extending a short distance above the lower end of the casing D. The shaft $D^3$ supports a conical hood F into the base of which extends the upper end of the casing D and the plate E', and on the said shaft $D^3$ is also secured a vane G in axial alinement with the shaft $D^3$ of the casing D, the plane of the vane G intersecting the casing D at the open end thereof, as will be readily understood by reference to Fig. 3. By the arrangement described, the vane G holds the casing D in such position relative to the wind wheel that approximately one-half portion thereof is exposed to the force of the wind to rotate the wind wheel in the direction of the arrow $a'$ (see Fig. 3).

In case the wind increases in force it is desirable to cut off the wind more or less from the wings C', and for this purpose use is made of a cut-off valve H in the form of a segment mounted to slide exteriorly on the casing D and supported from the top thereof by lugs H' and $H^2$, as plainly indicated in Fig. 2. The lugs H' and $H^2$ extend across and are adapted to slide on the upper edge of the casing top D' and are connected with the ends of ropes, cables or similar flexible connections K, K' which extend around guide pulleys L mounted on the top D' of the drum D near the margin of the said top, as plainly indicated in Fig. 1. The pulleys L are located approximately diametrically opposite each other, and the flexible connections K, K' after leaving the pulleys L extend inwardly and pass under guide pulleys L' journaled in the wall of the hollow shaft $D^3$ so that the flexible connections K, K' pass upward within the hollow shaft $D^3$, and then over guide pulleys $L^2$ journaled in the wall of the hollow shaft $D^3$ a distance above the bearings E. The flexible connections K and K' extend from the guide pulleys $L^2$ over guide pulleys $L^3$ journaled in the vane G, and the ends of the said flexible connections wind on a drum N, having its shaft N' journaled in the vane G near the lower end thereof, as plainly indicated in Fig. 1.

The shaft N' is provided at one end with a crank O under the control of the operator for turning the drum N in either direction so as to wind up one of the flexible connections K, K' while unwinding the other flexible connection K' or K. When winding up the flexible connection K a pull is exerted on the cut-off valve H to shift the latter in the direction of the arrow b' (see Figs. 2 and 3) with a view to project the cut-off valve H beyond the corresponding edge of the casing D so as to cut off more or less of the wind from the wind wheel in case the wind increases in force. The segmental cut-off valve H when shifted its entire width beyond the corresponding edge of the casing D cuts off nearly all the wind from the wind wheel so that in case of storm the wind wheel is rotated without the powerful wind doing damage to the wind wheel and connected parts. When the wind is diminished in force the drum N is turned in the opposite direction so that the flexible connection K unwinds while the flexible connection K' is wound up, whereby the cut-off valve H is shifted in the inverse direction of the arrow b', that is, is slipped back on the peripheral face of the casing D to allow more wind to reach the wings C' of the wind mill. The drum shaft N' is provided on the end opposite the one carrying the crank O with a pointer P indicating on a graduation Q the force of the wind, so that the operator on turning the crank O and watching the pointer P can readily shift the cut-off valve H to the desired position according to the force of the wind prevailing at the time and indicated by the pointer P on the graduation Q.

From the foregoing it will be seen that the cut-off valve H can be readily shifted by the operator without stopping the wind wheel, as the shifting mechanism for the said cut-off valve H is arranged on the vane G and the parts connected with the casing D controlled by the vane.

The rotary motion of the shaft of the wind wheel is transmitted by gear wheels R and R' to a driven shaft R² connected with the machinery to be driven.

Having thus described my invention, I claim as new and desire to secure by Letters Patent:

1. A wind mill, comprising a wind wheel, a segmental casing inclosing a portion of the said wind wheel and mounted to turn independently thereof, a vane on the said casing, cut-off means on the said casing, a drum on the vane, a flexible connection between the drum and the said cut-off means for shifting the latter on the casing to cut the wind off more or less from the wind wheel, a pointer turning with the said drum, and a dial on the vane and on which indicates the said pointer.

2. A wind mill, comprising a wind wheel having a vertically-disposed shaft and vertical wings, a semicircular casing mounted to turn independently of the said wind wheel and inclosing approximately one half of the peripheral face of the wind wheel, a vane fixed on the said casing, a segmental cut-off valve movably mounted on the said casing and adapted to form an extension thereof to cut off more or less wind from the wind wheel, cables connected with the said cut-off valve, a drum journaled on the said vane and on which wind the said cables, and guide pulleys for the said cables and mounted on the said casing and vane.

3. A wind mill, comprising a wind wheel having a vertically-disposed shaft and vertical wings, a semicircular casing mounted to turn independently of the said wind wheel and inclosing approximately one-half of the peripheral face of the wind wheel, a vane fixed on the said casing, a segmental cut-off valve movably mounted on the said casing and adapted to form an extension thereof to cut off more or less wind from the wind wheel, cables connected with the said cut-off valve, a drum journaled on the said vane and on which wind the said cables, guide pulleys for the said cables and mounted on the said casing and vane, a crank on one end of the said drum, a pointer on the other end of the drum, and a dial on the said vane and on which indicates the said pointer.

In testimony whereof I have signed my name to this specification in the presence of two subscribing witnesses.

WILHELM T. SANTALA.

Witnesses:
 THEO. G. HOSTER,
 PHILIP D. ROLLHAUS.

---

Copies of this patent may be obtained for five cents each, by addressing the "Commissioner of Patents, Washington, D. C."